United States Patent
Mikajiri et al.

(10) Patent No.: US 8,118,647 B2
(45) Date of Patent: Feb. 21, 2012

(54) DEVICE FOR PUNCHING OUT AND COLLECTING EYEBALL SECTION OF FISH

(75) Inventors: Akihiro Mikajiri, Tokyo (JP); Kohji Morita, Osaka (JP); Hisatomo Tanaka, Osaka (JP)

(73) Assignees: Nippon Suisan Kaisha, Ltd., Tokyo (JP); Toyo Suisan Kikai Co., Ltd., Osaka (JP)

( * ) Notice: Subject to any disclaimer, the term of this patent is extended or adjusted under 35 U.S.C. 154(b) by 0 days.

(21) Appl. No.: 13/064,772

(22) Filed: Apr. 14, 2011

(65) Prior Publication Data

US 2011/0256820 A1   Oct. 20, 2011

(30) Foreign Application Priority Data

Apr. 16, 2010   (JP) ................................ 2010-095156

(51) Int. Cl.
*A22C 25/00* (2006.01)
*A22C 25/08* (2006.01)
(52) U.S. Cl. ...................... 452/150; 452/149; 452/156
(58) Field of Classification Search .......... 452/149–151, 452/155–157, 163
See application file for complete search history.

(56) References Cited

U.S. PATENT DOCUMENTS

| | | | | | |
|---|---|---|---|---|---|
| 3,082,094 | A | * | 3/1963 | Kramer | 452/121 |
| 3,675,273 | A | * | 7/1972 | Vidjak | 452/121 |
| 3,925,847 | A | * | 12/1975 | Leander et al. | 452/154 |
| 4,170,806 | A | * | 10/1979 | Pettersson | 452/154 |
| 4,583,265 | A | * | 4/1986 | Kristinsson | 452/155 |
| 5,083,972 | A | * | 1/1992 | King | 452/108 |
| 5,505,658 | A | * | 4/1996 | Palmason | 452/196 |
| 6,361,426 | B1 | * | 3/2002 | Kragh | 452/161 |
| 6,688,962 | B1 | * | 2/2004 | Ketels et al. | 452/163 |
| 2010/0048115 | A1 | * | 2/2010 | Shimachi et al. | 452/149 |

FOREIGN PATENT DOCUMENTS

JP         615483 U      3/1994

* cited by examiner

*Primary Examiner* — David Parsley
(74) *Attorney, Agent, or Firm* — Ronald E. Greigg

(57) ABSTRACT

A device for efficiently and accurately punching out and collecting in a continuous and automatic manner an eyeball section of a fish. The device comprises a head part supporting table and a body part supporting table which can be opened and closed. The head part supporting table has an eyeball section discharge hole and a head part gripping device arranged on both sides of the head part supporting table to position an eyeball section of the fish on the eyeball section discharge hole. The device further comprises an eyeball section punching out blade body arranged above the eyeball section discharge hole in a manner of being movable up and down. The eyeball section of the fish is punched out by the punching out blade body and the punched out eyeball is collected through a suction hose connected to and communicating with a lower face of the eyeball section discharge hole.

16 Claims, 13 Drawing Sheets

Fig. 4
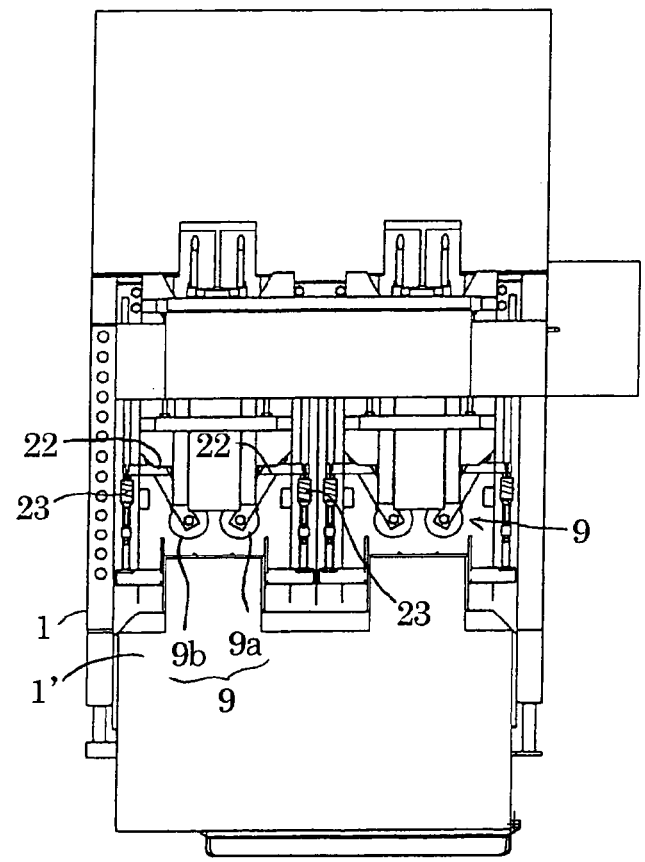
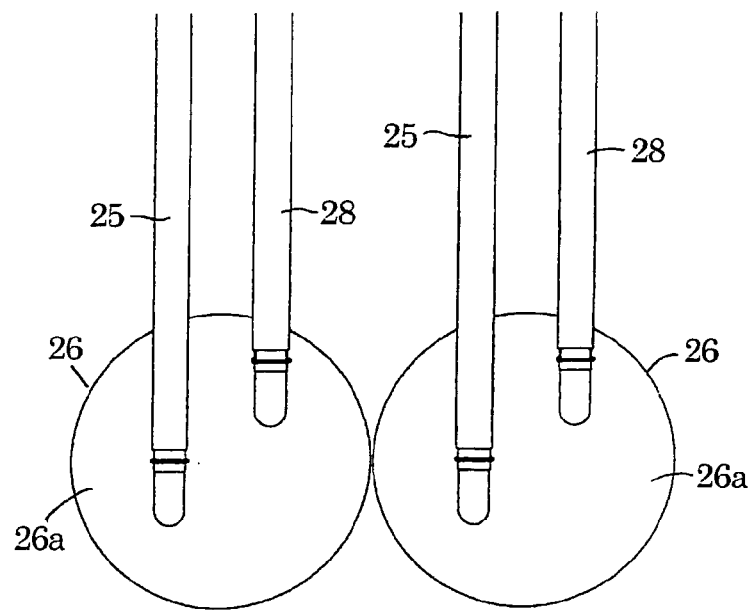

DEVICE FOR PUNCHING OUT AND COLLECTING EYEBALL SECTION OF FISH

FIELD OF THE INVENTION

This invention relates to a device for punching out and collecting eyeballs and their surrounding parts from a fish, in particular from head parts of bonito or tuna.

BACKGROUND OF THE INVENTION

A large amount of component to be used as a raw material of a nutritive substance is contained in the eyeballs and in particular in the fat tissue surrounding the eyeballs of a bonito or a tuna. Therefore, a large amount of the component can be efficiently obtained when the eyeballs and their surrounding parts, which will be referred to as an "eyeball section" hereinafter, of the fish are taken from the head part. For that purpose, it is necessary to punch out and collect only the eyeball section from the head of the fish like the bonito. A device for punching out the eyeballs of a fish has been invented like the punching-out device as described in the Japanese patent document JP 6-15483, for example, though the purpose of the punching out is different from that of this invention in the sense that the purpose of the prior art is not to obtain the component like the nutritive substance as mentioned above, but to enable a comparatively small fish like a small horse mackerel to be eaten as a whole including bones when the fish is deep fried by removing the eyeballs which cannot be made tender even by deep frying.

The device for punching out the eyeballs of the fish described in the Japanese patent document JP 6-15483 is to punch out the eyeballs of only a comparatively small fish like the small horse mackerel. The device comprises a receiving table for placing a head part of the fish. The receiving table has a through hole pierced vertically at a position for placing the eyeballs. A guide is provided on a side plate erected on the receiving table. A circular-cylindrical projecting punch having a cutting blade formed at a lower end thereof is supported by the guide in a vertically movable manner on a center line same as that of the through hole. By rotating a lever, which is supported by the side plate in a rotatable manner, downward against spring force, the projecting punch is moved down to punch out the eyeballs of the fish placed on the receiving table in the lying state with the cutting blade mounted on the lower end of the projecting punch.

Document of Prior Art

Patent Document (Patent Document 1) Utility Model Publication Gazette H6-15483

DESCRIPTION OF THE INVENTION

Problem to be Solved

However, according to the device of the prior art for punching out the eyeball of the fish, the eyeball has to be positioned on the through hole formed in the receiving table when the fish is fed onto the receiving table. In addition, since the projecting punch has to be moved down by operation of a lever to punch out the eyeballs of the fish after confirming that the positioning has been completed, the punching treatment takes time and labor, making the treatment efficiency very low. Furthermore, a lower-positioned eyeball may not be punched out accurately even when an upper-positioned eyeball is punched out accurately because the fish is not fixed to maintain the posture after being positioned and therefore the back-belly direction of the lying fish may be inclined relative to the horizontal plane when the eyeballs are punched out by the projecting punch.

Further, as the lever is operated manually requiring much time and labor, the device is not suitable for punching out the eyeballs of a number of fish. In addition, it is difficult to punch out the eyeball section of a comparatively large fish like a bonito or a tuna since the projecting punch shears the eyeball section in a manner of pushing and cutting off without rotating. Furthermore, the treatment efficiency is lowered since the fish has to be removed from the receiving table by hand after the eyeballs are punched out so that the eyeballs of another fish can be punched out. There is another problem that a punched-out eyeball section clogs up inside the projecting punch, causing degradation of cutting efficiency, when the eyeball section of the fish is punched out by the circular cylindrical projecting punch.

This invention has been made in view of the above-mentioned problems. The purpose of this invention is to provide a device for punching out and collecting an eyeball section of a fish by which the eyeball section of a comparatively large fish like a bonito or a tuna can be punched out quickly, efficiently and accurately, the punched-out eyeball section can be collected quickly, and the fish after the punching-out treatment can be removed quickly.

Means to Solve the Problem

In order to achieve the above-mentioned purpose, the device for punching out and collecting an eyeball section of a fish according to this invention comprises a head part supporting table arranged at a fish-feeding terminal end of a device base in a downward rotatable manner; the head part supporting table having an eyeball section discharge hole pierced in the center of the device base through the upper to lower faces of the head part supporting table to discharge the eyeball section of the fish, a body part supporting table arranged in an openable and closable manner to support the body part of the fish fed in the lying, state and to remove the fish by opening downward after punching out the eyeball section, an eyeball section punching-out blade body of a circular cylindrical shape arranged above the eyeball section discharge hole formed in the head part supporting table in a vertically movable and rotatable manner; a lower end of the eyeball section punching-out blade body being formed into a punching-out blade to punch out the eyeball section of the fish while moving down and rotating and to enter the eyeball section discharge hole formed in the head part supporting table, a stopper for receiving and stopping a front end of the head part of the fish fed onto the head part supporting table from the body part supporting table side; the stopper being made for positioning the eyeball section on the eyeball section discharge hole formed in the head part supporting table, a head part gripping means arranged on both sides of the head part supporting table to grip the head part in a manner of sandwiching the head part and of allowing it to escape downward, a suction hose connected to a lower face of the head part supporting table in an integrating manner and communicating with the eyeball section discharge hole of the head part supporting table at an upper end opening part thereof, a supporting table opening and closing mechanism for the head part supporting table constructed to enable the head part to be discharged downward by downward rotation of the head part supporting table, to which the suction hose is connected, and an opening and closing mechanism for the body part supporting table constructed to move in harmony with the supporting table opening and closing mechanism.

In the device for punching out and collecting the eyeball section of the fish which is thus structured, this invention of Claim 2, further comprises a fish feeding conveyor which is arranged above the body part supporting table to feed the head part of the fish, which is fed onto the body part supporting table, toward the head part supporting table and to allow the stopper to receive and stop the front end of the head part.

Claim 3 of this invention further comprises a discharge conveyor which is arranged below the body part supporting table to discharge the fish to the outside after the eyeball section is punched out.

Claim 4 of this invention further comprises a pair of rollers which is urged in the direction of gripping the head part of the fish in a sandwiching manner by spring force, in which one of the rollers supporting the jaw of the head part has a circumferential groove having a dogleg shape in vertical section to receive and hold the jaw, and another roller having no circumferential groove and receiving a top of the head is formed into a columnar shape by which the top of the head can escape from a lower end of the roller while sliding on the circumferential surface of the roller.

Claim 5 of this invention further comprises a sensor which is arranged on a side of the head part supporting table to detect the head part of the fish fed onto the head part supporting table and actuate the punching-out blade body.

Advantages of the Invention

According to the invention as claimed in Claim 1, the device for punching out and collecting the eyeball section of the fish comprises a head part supporting table arranged at a fish-feeding terminal end of a device base in a downward rotatable manner; the head part supporting table having an eyeball section discharge hole pierced in the center of the device base through the upper to lower faces of the head part supporting table to discharge the eyeball section of the fish, a body part supporting table arranged in an openable and closable manner to support the body part of the fish fed in the lying state and to remove the fish by opening downward after punching out the eyeball section, an eyeball section punching-out blade body of a circular cylindrical shape arranged above the eyeball section discharge hole formed in the head part supporting table in a vertically movable and rotatable manner; a lower end of the eyeball section punching-out blade body being formed into a punching-out blade to punch out the eyeball section of the fish while moving down and rotating and to enter the eyeball section discharge hole formed in the head part supporting table, a stopper for receiving and stopping a front end of the head part of the fish fed onto the head part supporting table from the body part supporting table side; the stopper being made for positioning the eyeball section on the eyeball section discharge hole formed in the head part supporting table, and a head part gripping means arranged on both sides of the head part supporting table to grip the head part in a manner of sandwiching the head part and of allowing it to escape downward.

Therefore, when the fish is fed onto the body part supporting table in its lying state with the back-belly direction oriented horizontally, the front end of the head part is received and stopped by the stopper when it arrives onto the head part supporting table, and the eyeball section can be easily and accurately positioned on the eyeball section discharge hole formed in the head part supporting table.

In addition, the head part is held in a sandwiching manner by the gripping means arranged on both sides of the head part supporting table, and the head part can be quickly fixed in the state that the back-belly direction is accurately oriented horizontally, or in other wars, in the state that the eyeball section is positioned right on the eyeball section discharge hole and that the other eyeball section facing the upper side is positioned right above the lower-positioned eyeball section.

Furthermore, since the eyeball section punching-out blade body which has a circular cylindrical shape is arranged, in a vertically movable and rotatable manner, above the eyeball section discharge hole formed in the head part supporting table, the eyeball section of the head part of the fish placed on the head part supporting table can be punched out by moving the eyeball section punching-out blade body downward. In this occasion, the head part is fixed by the gripping means in the state that the upward-oriented eyeball section and the downward-oriented eyeball section are positioned accurately on the eyeball section discharge hole. Since the punching-out blade body moves down while rotating, it can accurately and smoothly punch out the eyeball section all the way through from the upward-oriented eyeball section to the downward-oriented eyeball section.

In addition, since the upper end opening part of the suction hose communicates with the lower face of the head part supporting table, the eyeball section punched out by the eyeball section punching-out blade body having the cylindrical shape can be surely suctioned and removed into the suction hose by the suction force of the suction hose through the eyeball section discharge hole. The eyeball section is collected in a container or the like through the suction hose and a material like a nutritive substance can be efficiently extracted from the eyeball section after the collection. The supporting table opening and closing mechanism is arranged to enable the head part to be discharged downward by rotating the head part supporting table, to which the suction hose is connected. The opening and closing mechanism of the body part supporting table is arranged in a manner of being operated in harmony with the supporting table opening and closing mechanism. Therefore, the fish whose eyeball section is punched out can be immediately discharged by opening the head part supporting table and the body part supporting table downward by these opening and closing mechanisms, and the eyeball section of the fish can be punched out and collected efficiently and surely one after another.

According to the invention as claimed in Claim 2, the fish-feeding conveyor is arranged above the body part supporting table to send the head part of the fish fed onto the body part supporting table toward the head part supporting table and to allow the stopper to receive and stop the front end of the head part. Therefore, when the fish is fed onto the body part supporting table, the fish body is pushed to the side of the stopper by the fish-feeding conveyor. The front end of the head part is promptly received and stopped by the stopper, and the head part is gripped by gripping members in a sandwiching manner, so that the head part can be gripped and positioned to be in the posture for punching-out treatment of the eyeball section.

According to the invention as claimed in Claim 3, the discharge conveyor is arranged below the body part supporting table to discharge the fish to the outside after the eyeball section is punched out. Therefore, the fish can be automatically discharged from the device for punching out the eyeball section to an intended position, by which another fish can smoothly and effectively undergo the punching-out treatment of the eyeball section.

According to the invention as claimed in Claim 4, the head part gripping means comprises a pair of rollers which is urged by the spring force in the direction of gripping the head part of the fish in a sandwiching manner. By elastically sandwiching the head part, which is fed onto the head part supporting table, between the rollers, the eyeball section can be promptly and accurately positioned on the eyeball section discharge hole formed in the head part supporting table. One of the rollers supporting a jaw of the head part has a circumferential groove having a dogleg shape in vertical section to receive and support the jaw. The other roller receiving and stopping the top of the head part has no circumferential groove but it is formed into a columnar shape for receiving and stopping the top of the head.

Therefore, when the head part supporting table is opened downward together with the body part supporting table after punching out the eyeball section, the head part, which is received by the columnar-shaped roller, can surely escape from the roller while being slid downward along the roller, with the jaw, received by the circumferential groove of the roller, serving as a fulcrum, and the fish from which the eyeball is punched out can be smoothly discharged downward without being caught by these rollers.

According to the invention as claimed in Claim 5, the sensor is arranged on a side of the head part supporting table to detect the head part of the fish fed onto the head part supporting table and actuate the eyeball section punching-out blade body.

Therefore, when the front end of the head part of the fish is brought into contact with the stopper on the head part supporting table, the eyeball section punching-out blade body automatically moves down and can quickly punch out the eyeball section of the fish. After the eyeball section is punched out, the opening and closing mechanisms of the head part supporting table and the body part supporting table are actuated in the opening direction, following elevation of the punching-out blade body, so that the fish can be discharged downward immediately after the punching-out treatment of the eyeball section. Consequently, automatic and high-speed punching and collection of the eyeball section of the fish is made possible.

FIG. 4 is a simplified plan view of two devices arranged side by side.

PREFERRED EMBODIMENT OF THE INVENTION

Figure 1:
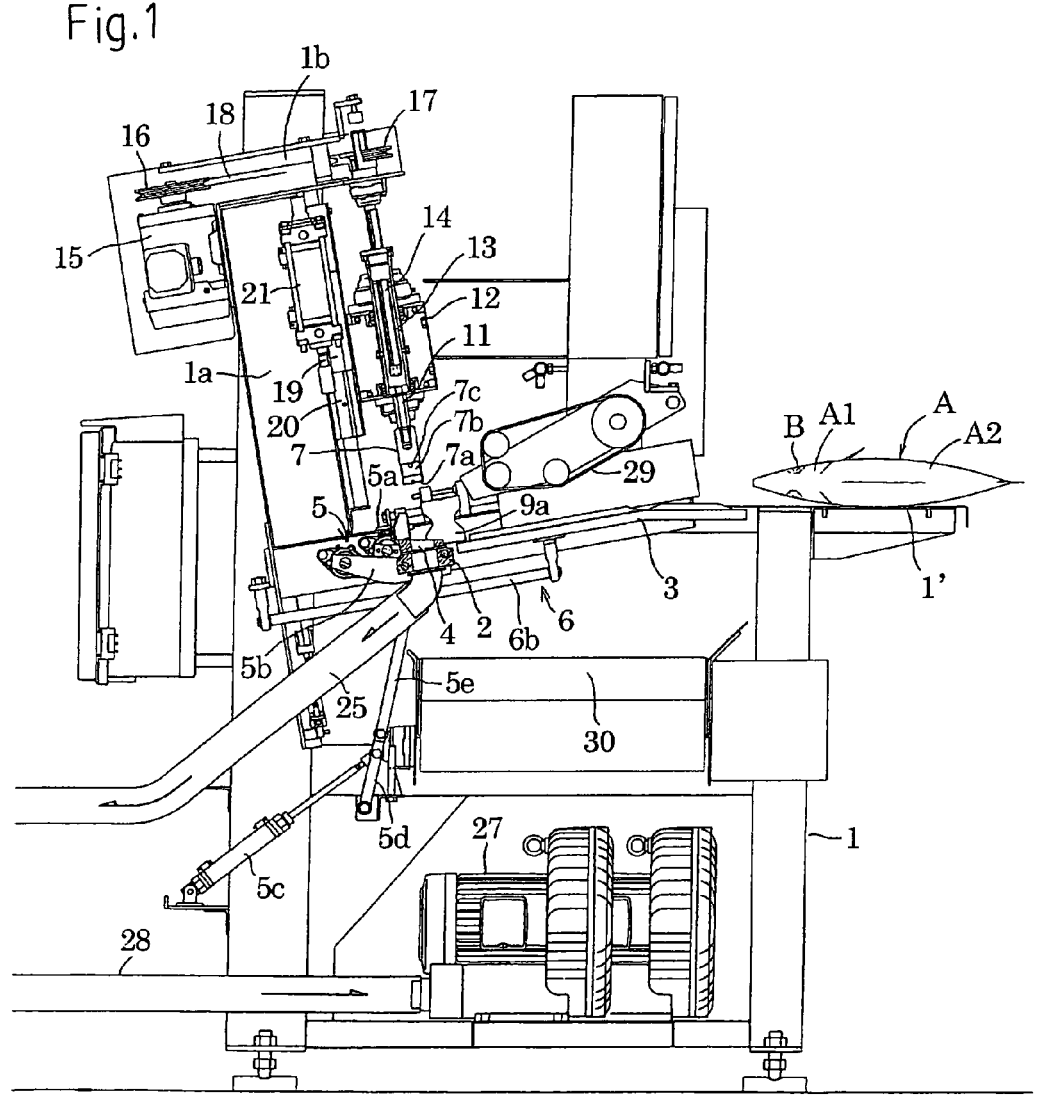
FIG. 1 is a sectional side view of a part of the device of the invention.

Specific embodiment of the invention is described hereinafter based on the drawings. As shown in FIGS. 1 to 4, a machine base 1 has a feeding table 1' on an upper face of the rear side of the machine base 1 for feeding a fish A like a bonito or a tuna, and a head part supporting table 2 on the front end of the machine base 1 for supporting a head part A1 of the fish A. A body part supporting table 3 supporting a body part A2 of the fish A is arranged between the feeding table 1' and the head part supporting table 2. The feeding table 1' is horizontally arranged. The head part supporting table 2 is arranged at the position a little lower than the feeding table 1'. The body part supporting table 3 is gently inclined obliquely downward from a rear end of the body part supporting table 3 toward the front end near the head part supporting table 2, so that the fish A can be fed from the feeding table 1' to the head part supporting table 2 easily and surely.

An eyeball section discharge hole 4 is pierced in the center part of the head part supporting table 2 through the upper to lower faces. The eyeball section discharge hole 4 has the size capable of discharging the eyeball section B of the fish A punched out by a punching-out blade body 7, which will be described later, and has the diameter little larger than that of the punching-out blade body 7. The head part supporting table 2 is structured so that it may be rotated and opened downward by an opening/closing mechanism 5 to discharge the fish downward from the head part thereof.

The opening and closing mechanism 5 comprises front and rear parallel links 5a, 5b (See FIGS. 1 and 13.) which are arranged parallel. Rear ends of the front and rear parallel links 5a, 5b are rotatably pivoted to front and rear parts of both sides of the head part supporting table 2, respectively. Front ends of the parallel links 5a, 5b are rotatably pivoted to oppositely-arranged side wall surfaces of the machine base 1 on both sides of the head part supporting table 2 at the same interval as that of the front and rear pivoting parts, so that the length between the front and rear pivoting part of the front link 5a and the length between the front and rear pivoting part of the rear link 5b may be the same. When the parallel links 5a, 5b are rotated downward around the front-side pivoting part, the head part supporting table 2 is lowered while the eyeball section discharge hole 4 is held to be in a vertical state at all times, and is rotated obliquely forward as it is lowered so that support of the head part A1 of the fish A by the head part supporting table 2 may be released. Further, a cylinder 5c is arranged in a lower part of the machine base 1. A front end of a piston rod of the cylinder 5c is connected to an upper end of a first lever 5d whose rear end is rotatably pivoted to a lower part of the machine base 1. A lower end of a second lever 5e whose upper end is rotatably pivoted to a projecting end part projecting rearward from a pivoting part facing a side face of the head part supporting table 2 in the front link 5a is rotatably pivoted to the upper end of the first lever 5d. By actuating the cylinder 5c, the parallel links 5a, 5d are moved by the intermediary of the first and second levers 5d, 5e, and the head supporting part of the head part supporting table 2 is opened and closed.

Figure 9:
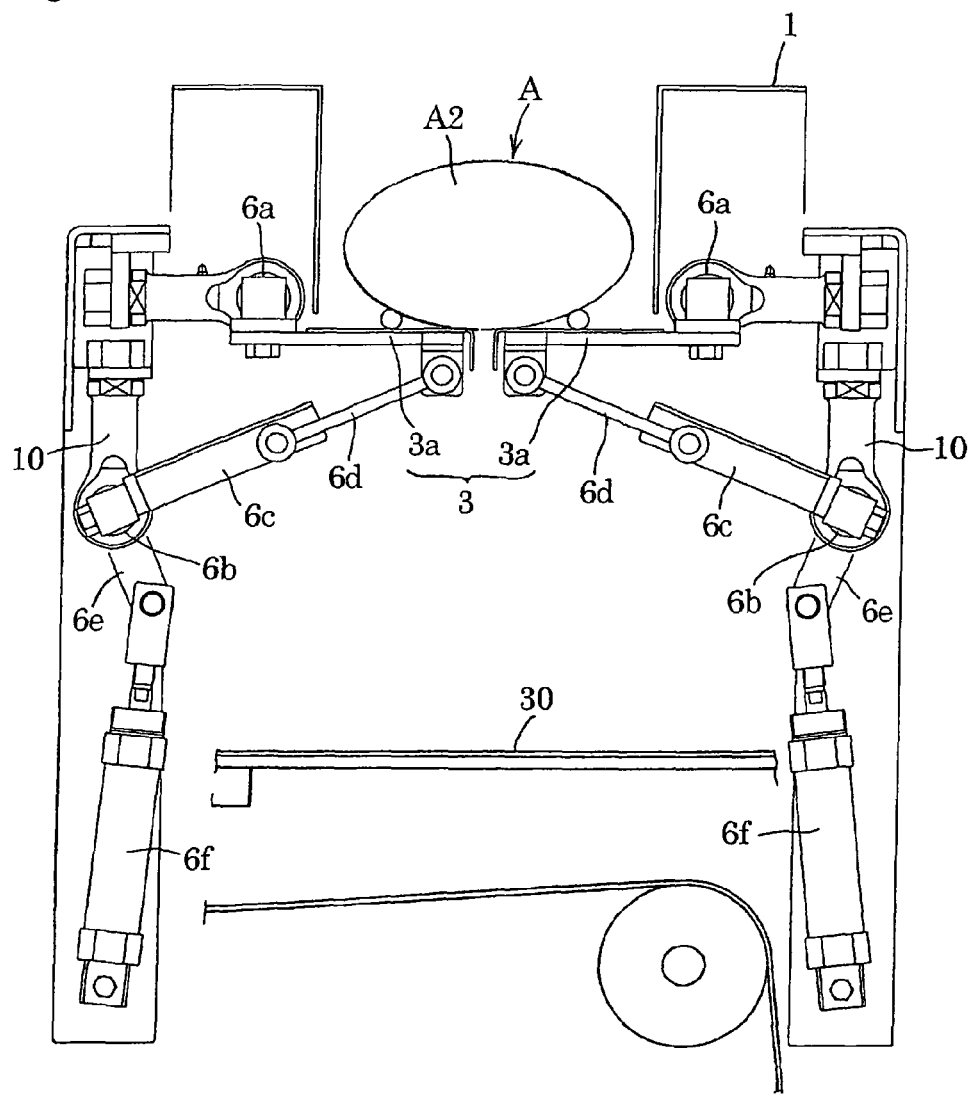
FIG. 9 is a front view of the body part supporting table.

The body part supporting table 3 is also structured in a similar manner in which the body supporting table 3 is rotated and opened downward by an opening and closing mechanism 6 so that the body part A2 of the fish A can be discharged downward. The body part supporting table 3 is divided into two body-part supporting table sections 3a, 3a arranged on both sides as shown in FIG. 9. Outer ends of the supporting table sections 3a, 3a on both sides are respectively fixed to first parallel rotating rods 6a, 6a supported to wall faces of the machine base 1 which face each other by the intermediary of the body part supporting table 3. The supporting table sections 3a, 3a are rotated downward around the rotating rods 6a, 6a, by the rotation of the rotating rods 6a, 6a, by which a space of the supporting part of the body of the fish A is opened. By rotating the first parallel rotating rods 6a, 6a in the reverse direction, the space of the body supporting part is closed.

In the opening and closing mechanism of the body part supporting table 3, bearing members 10, 10 are fixed to front and rear parts of lower end faces of the mutually facing wall faces of the machine base 1 supporting the first parallel rotating rods 6a, 6a. Second parallel rotating rods 6b, 6b are rotatably supported respectively between the front and rear bearing members 10, 10 on both sides. Outer ends of levers 6c, 6c are fixed to the second parallel rods 6b, 6b, and inner ends of the levers 6c, 6c are rotatably connected to lower faces of mutually facing inner ends of the supporting table sections 3a, 3a on both sides by connecting rods 6d, 6d. A piston rod of a cylinder 6f is connected to each of the second parallel rotating rods 6b, 6b by the intermediary of a lever 6e. The supporting table sections 3a, 3a on both sides are opened and closed, as mentioned above, by operation of the cylinder 6f.

In the meantime, on the side of the head part supporting table 2, a circular cylindrical punching blade body 7 is arranged on a center line of the eyeball section discharge hole 4 formed in the head part supporting table 2 in a vertically movable manner. A lower end of the punching-out blade body 7 for punching out the eyeball section B of the fish A while rotating is formed into a punching-out blade 7a. A lower end of a rotary shaft 11 is fixed to a center part of an upper end of the punching-out blade body 7 on the axis line same as that of the punching-out blade body 7. An upper end of the rotary shaft 11 is rotatably supported to a lower end of an elevating frame 12 arranged to be elevatable along a rear face of a fixed vertical frame 1a erecting on a front end of the machine base 1. Further, a lower end of a hollow shaft 13 provided with a spline groove hole in the center is connected to an upper end of the rotary shaft 11 on the axis line same as that of the rotary shaft 11. Upper acid lower ends of the hollow shaft 13 are supported to upper and lower ends of a center part of the elevating frame 12 in a manner of being rotatable and elevatable together with the elevating frame 12. A recess 7b capable of receiving the eyeball section B which is punched out is formed at a lower end of the punching-out blade body 7. An air vent 7c communicating with the outside from the recess 7b is formed in a deep part of the recess 7b.

A lateral frame 1b is arranged, in an integrating manner, on an upper end of the fixed vertical frame 1a provided on the machine base 1, and a rear end of the lateral frame 1b is protruded rearward from the upper end of the fixed vertical frame 1a. An upper end of a spline shaft 14, which is fitted with spline engagement, to the spline groove hole of the hollow shaft 13 in a vertically slidable manner, is rotatably supported to the projecting end. The spline shaft 14 is driven and rotated by the intermediary of a drive belt 18 arranged between a pulley 16 fixed to a rotary shaft of a motor 15 and a pulley 17 fixed to an upper end of the spline shaft 14 by the motor 15 arranged at a front end of the lateral frame 1b. The rotation is transmitted to the punching out blade body 7 by the intermediary of the hollow shaft 13.

A guide rail 19 guiding the elevating frame 12 to be vertically movable is arranged on a rear face of the fixed vertical frame 1a. An engaging member 20 arranged on a front face of the elevating frame 12 is engaged with the guide rail 19 in a vertically slidable manner. A piston rod of a hydraulic cylinder 21 like an air cylinder mounted on a side face of the fixed vertical frame 1a is connected to the engaging member 20, and the elevating frame 12 is moved up and down by operation of the cylinder 21. When the elevating frame 12 is moved down, the eyeball section B of the fish A supported on the head part supporting table 2 is punched out from the head part A1 by the punching-out blade body 7.

Figure 5:
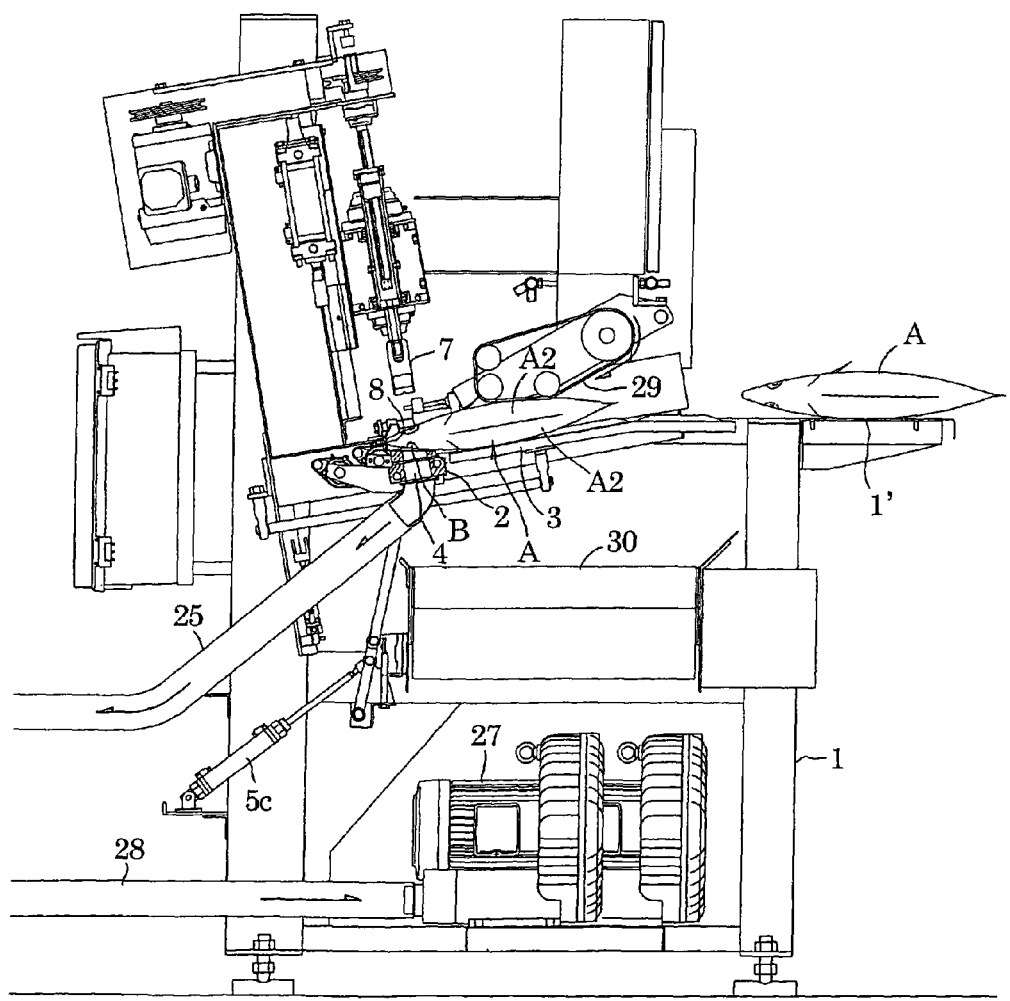
FIG. 5 is a sectional side view of a part of the device showing a fish in the state just before the punching-out treatment of the eyeball section.
Figure 8:
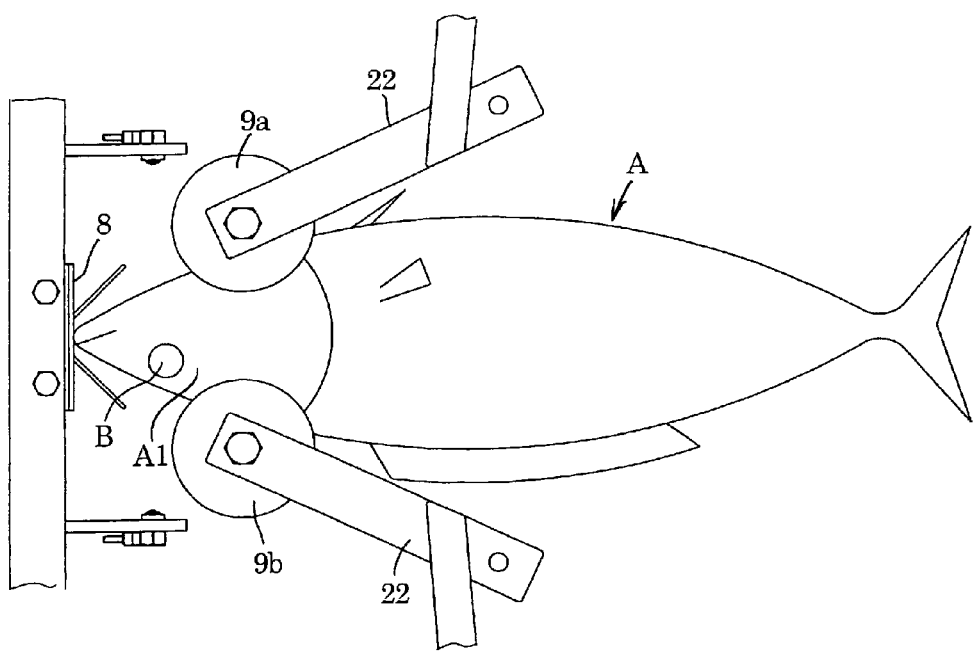
FIG. 8 is a plan view of the pair of rollers for gripping.

As shown in FIGS. 5 and 8, a stopper 8 receiving and stopping a front end of the head part of the fish A is arranged at an upper front end of the head part supporting table 2 on an upper end face of the machine base 1. The position of the stopper 8 is set in advance so that the eyeball section B of the fish A can be positioned on the eyeball section discharge hole 4 formed in the head part supporting table 2 when the front end of the head part of the fish A, fed from the rear side in the lying state with its back-belly direction oriented horizontally, hits the stopper 8 and is received and stopped by it.

A head part gripping means 9 comprises a pair of right and left rollers 9a, 9b which are respectively arranged on both sides of the head part supporting table 2 to fix and grip the head part A1 of the fish A in the state that a lower-positioned eyeball section B1 directly laid on the eyeball section discharge hole 4 and an upper-positioned eyeball section B2 oriented upward to face the punching-out blade 7a of the eyeball section punching-out blade body 7 are positioned on a center line of the eyeball section discharge hole 4, or in other words, immediately under the eyeball section punching-out blade body 7.

Figure 2:
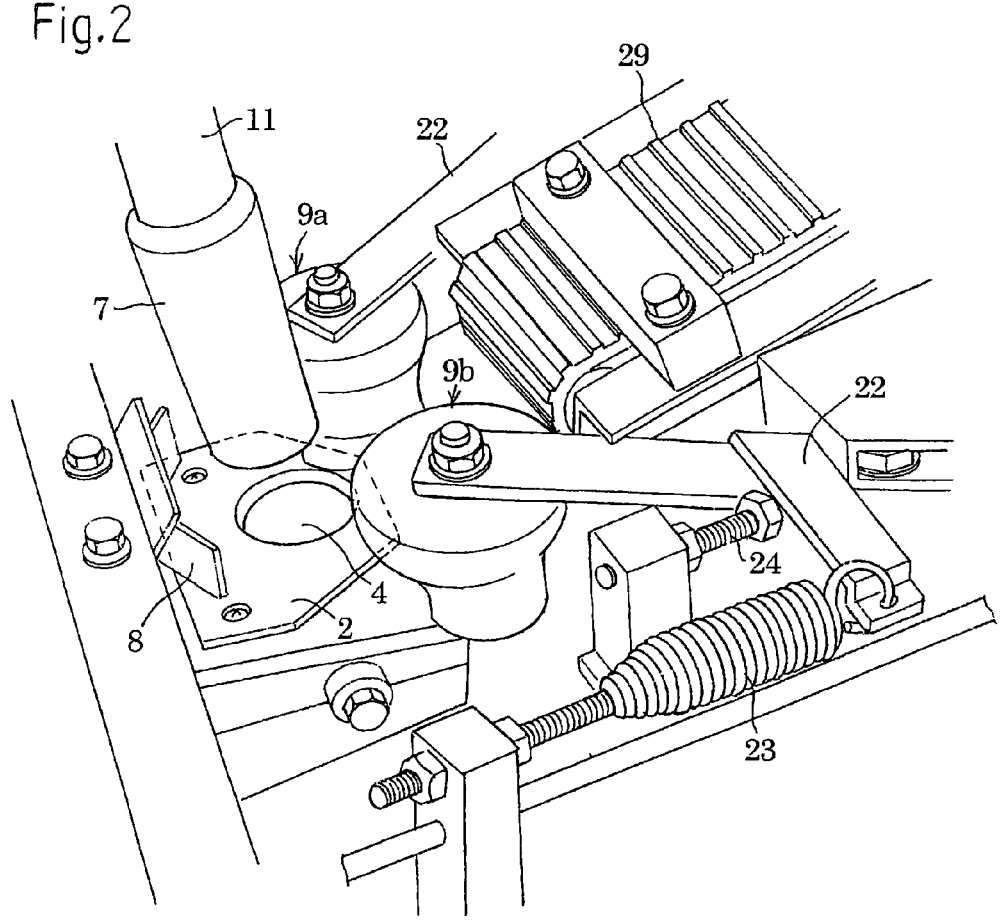
FIG. 2 is a perspective view of the head part supporting table of the device.

As shown in FIGS. 2 and 4, a center part of an upper face of each of these rollers 9a, 9b is rotatably supported to a front end of an arm 22, having a dogleg shape in plan view and being held horizontally. A base end of the dogleg shaped arm 22 is connected to an end of a tension spring 23 arranged on an upper face of each of both sides of the machine base 1. The other end of the tension spring 23 is fixed to the machine base 1. A bent part of the arm 22 is received and stopped by a front end of a bearing shaft 24 fixed to the machine base 1. Each of the rollers 9a, 9b is pressed and urged in the direction of gripping the head part A1 of the fish A by the tensile force of the spring 23 by the intermediary of the dogleg shaped arm 22 with the bearing shaft 24 serving as a fulcrum point. In the state that the fish A is not fed, circumferential surfaces of the upper ends of the rollers 9a, 9b facing each other are in contact with or close to each other.

Figure 7:
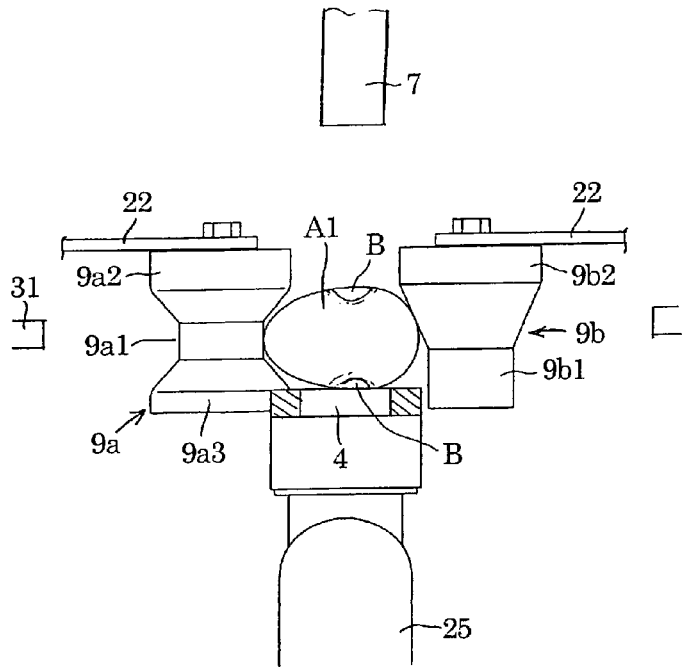
FIG. 7 is a front view of a pair of rollers gripping the head part in sandwiching manner.

Furthermore, as shown in FIGS. 7 and 8, the roller 9a receives and stops the side of a jaw of the head part A1 of the fish A fed in the lying state, and grips the head part A1 in cooperation with the other roller 9b. The roller 9a has a circumferential groove 9a1 in the circumferential surface which is formed to have a dogleg shape in vertical section to receive and hold the jaw. Upper and lower ends of the roller 9a are formed into larger diameter parts 9a2, 9a3. The other roller 9b receiving and stopping the side of the top of the head part A1 does not have a circumferential groove, but it includes a columnar section in the upper half having an inverted truncated conical shape whose diameter gradually becomes smaller from the upper end toward the lower end. A lower half of the roller 9b is formed into a columnar-shaped section 9b1 having the diameter same as that of the lower end of the columnar section in the upper half. An upper end of the roller 9b to which a front end of the arm 22 is pivoted is formed into a larger diameter section 9b2 having the same diameter as that of an upper end part of the roller 9a.

Figure 3:
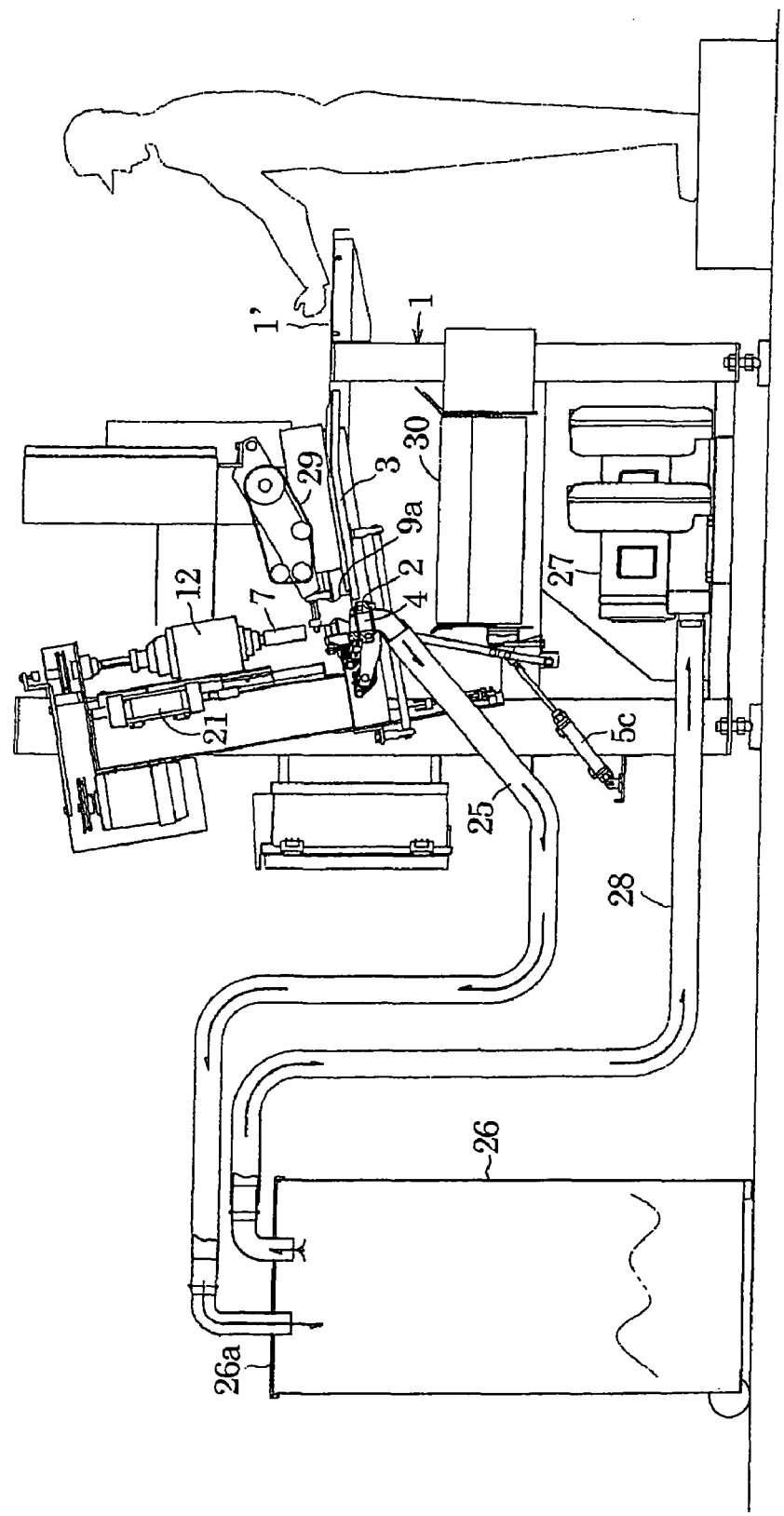
FIG. 3 is a side view of the whole device including an eyeball section storing tank.

An upper end opening part of a suction hose 25 for suctioning and removing the punched-out eyeball section B is connected to a lower face of the head part supporting table 2 in an integrating manner, and the upper opening part communicates with the eyeball section discharge hole 4 formed in the head part supporting table 2. As shown in FIG. 3, the other end part of the suction hose 25 penetrates, in an airtight state, an openable/closeable sealing cover 26a of an eyeball section collecting container 26 installed near the device of this invention, and faces the upper end part of the eyeball section collecting container 26. Further, the sealing cover 26a and an exhaust device 27 are connected with and communicate with each other by an exhaust hose 28. Thus, the exhaust device 27 deflates the inside of the eyeball section collecting container 26 through the exhaust hose 28, and suction force is generated in the suction hose 25 to suction the eyeball section B of the fish A punched out by the eyeball section punching out blade body 7, as described hereinafter, by which the eyeball section B is collected and deposited in the collecting container 26 by the suction force.

Furthermore, a fish-feeding conveyor 29 is arranged above the body part supporting table 3 to feed the fish A, which is fed onto the body part supporting table 3 in a lying state, to the side of the head part supporting table 2 from the head side of the fish A. A discharge conveyor 30 is arranged below the body part supporting table 3 to discharge the fish A to the outside after the punching-out treatment of the eyeball section B. The discharge conveyor 30 is operated at all times during the eyeball section punching-out treatment of the fish A.

A photoelectric sensor 31 comprising a light emitting and receiving device detecting that the head part A1 of the fish A is fed onto the head part supporting table 2 is installed on the side of the head part supporting table 2, as shown in FIG. 7. A control circuit, which is not shown in the drawing, is provided to actuate the eyeball section punching-out blade body 7 when feeding of the head part A1 is detected by the photoelectric sensor 31. A circuit is incorporated in the control circuit to simultaneously actuate the opening and closing mechanism 5 of the head part supporting table 2 and the opening and closing mechanism 6 of the body part supporting table 3 when the eyeball section punching-out blade body 7 is elevated.

The eyeball and the surrounding part of the eyeball, or in other words, the eyeball section B of the fish A like a bonito is punched out by using the automatic eyeball punching-out device in the way as described below. Namely, at first, the fish A is placed in its lying state on the feeding table 1' arranged at the rear end of the machine base 1 in a manner that the side of the back of the fish A faces the roller 9b of the head part gripping means 9 receiving and stopping the top of the head part A1 and that the head part is oriented to the front side, as shown in FIG. 1. Then, the fish A is sent by an operator from the feeding table 1' onto the body part supporting table 3. Otherwise, the fish A in the lying state as mentioned above may be transferred onto the feeding table 1' by a conveyor without being sent by an operator. Fish A brought onto the feeding table 1' are sent toward the body part supporting table 3 by a pushing means one after another at intervals of time required for each punching-out treatment of the eyeball section.

Figure 6:
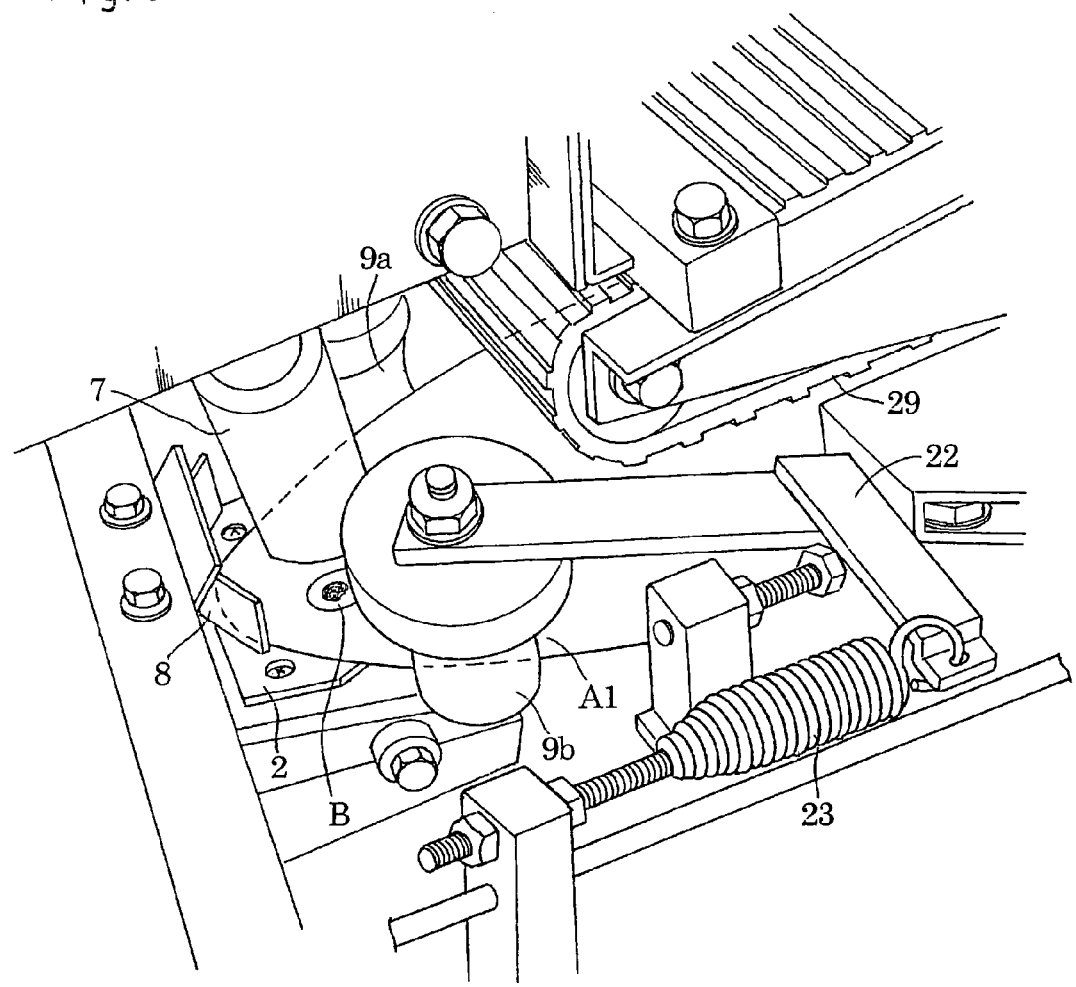
FIG. 6 is a perspective view of the part of the head part supporting table.

When the fish A is fed onto the body part supporting table 3, the fish-feeding conveyor 29 arranged above the body part supporting table 3 moves the fish A ahead by force and the front end of the head part is instantly brought into contact with and received by the stopper 8 as shown in FIGS. 5 and 6. Even after the front end of the head part is brought into contact with and received by the stopper 8, the fish-feeding conveyor 29 is in contact with the side face of the fish A facing upward in a sliding manner to apply the pressing force to the fish A so that the fish A may be prevented from unexpectedly retreating or moving haphazardly.

When the fish A is pushed forward by the fish-feeding conveyor 29 and the head part A1 is brought onto the head part supporting table 2, the head part A1 plunges between the pair of right and left rollers 9a, 9b, serving as a head part gripping means 9, from the front end of the head part, and the front end is brought into contact with and received by the stopper 8 as mentioned above, while expanding the space between the mutually facing circumferential faces of the rollers 9a, 9b against the tensile force of the tension springs 23, 23. In this occasion, the position of gripping the head part A1 under pressure and in a sandwiching manner between the right and left rollers 9a, 9b is set so that the eyeball section B of the fish A may be placed on the eyeball section discharge hole 4 without being displaced in right and left directions relative to the eyeball section discharge hole 4.

Furthermore, as shown in FIG. 7, the circumferential groove 9a1 which is formed in the circumferential part of the roller 9a to have a dogleg shape in vertical section receives the jaw of the head part A1 to hold it in an engaging manner preventing the haphazard movement in a vertical direction. The columnar-shaped section 9b1 of the other roller 9b receives and stops the top of the head part A1.

Consequently, the pair of right and left rollers 9a, 9b and the fish-feeding conveyor 29 pressing the upper side face of the body part A2 jointly hold the head part A1 in the state that the lower-positioned eyeball section B1, which is directly laid on the eyeball section discharge hole 4, and the upper-positioned eyeball section B2, which is laid to be oriented upward to face the punching-out blade 7a of the eyeball punching-out blade body 7, are placed on a center line of the eyeball section discharge hole 4, or in other words, placed immediately under a shaft center of the eyeball section punching-out blade body 7.

Figure 10:
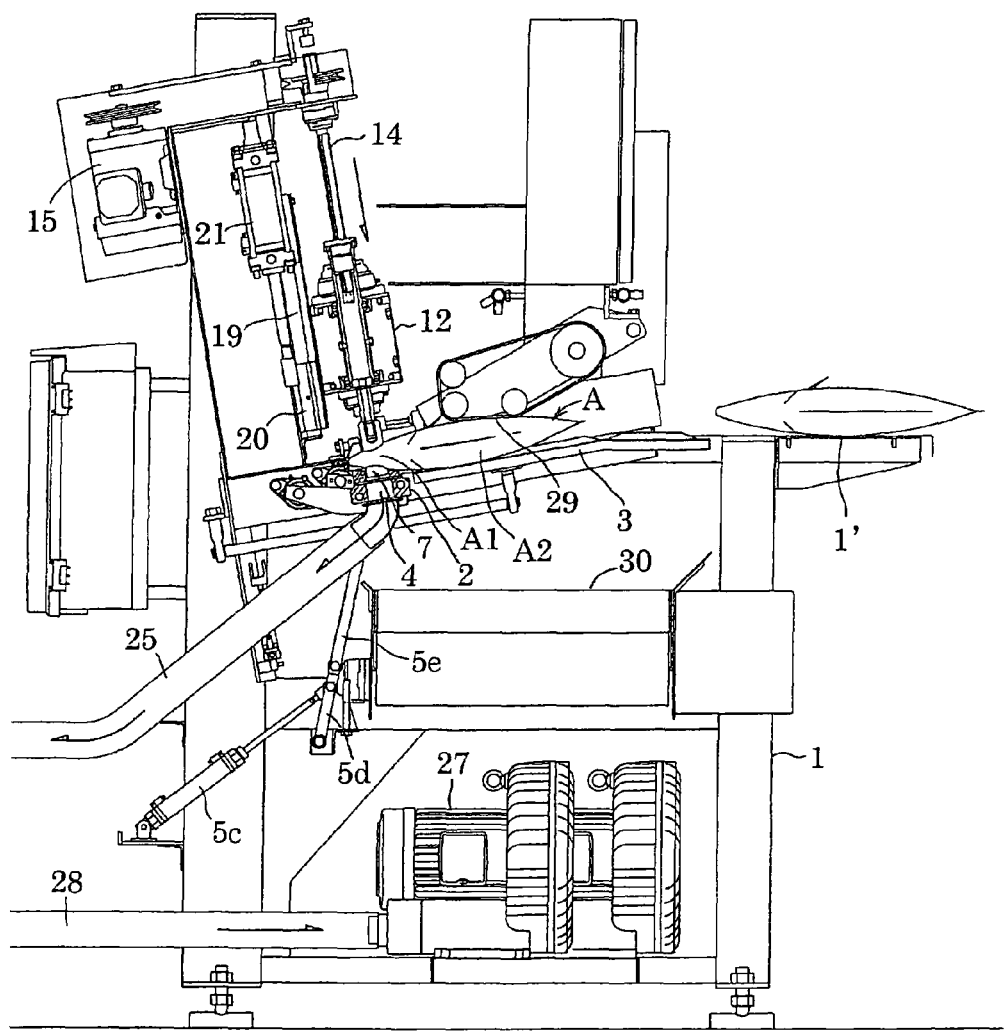
FIG. 10 is a sectional side view of a part of the device showing the state that the eyeball section of the fish is punched out.
Figure 11:
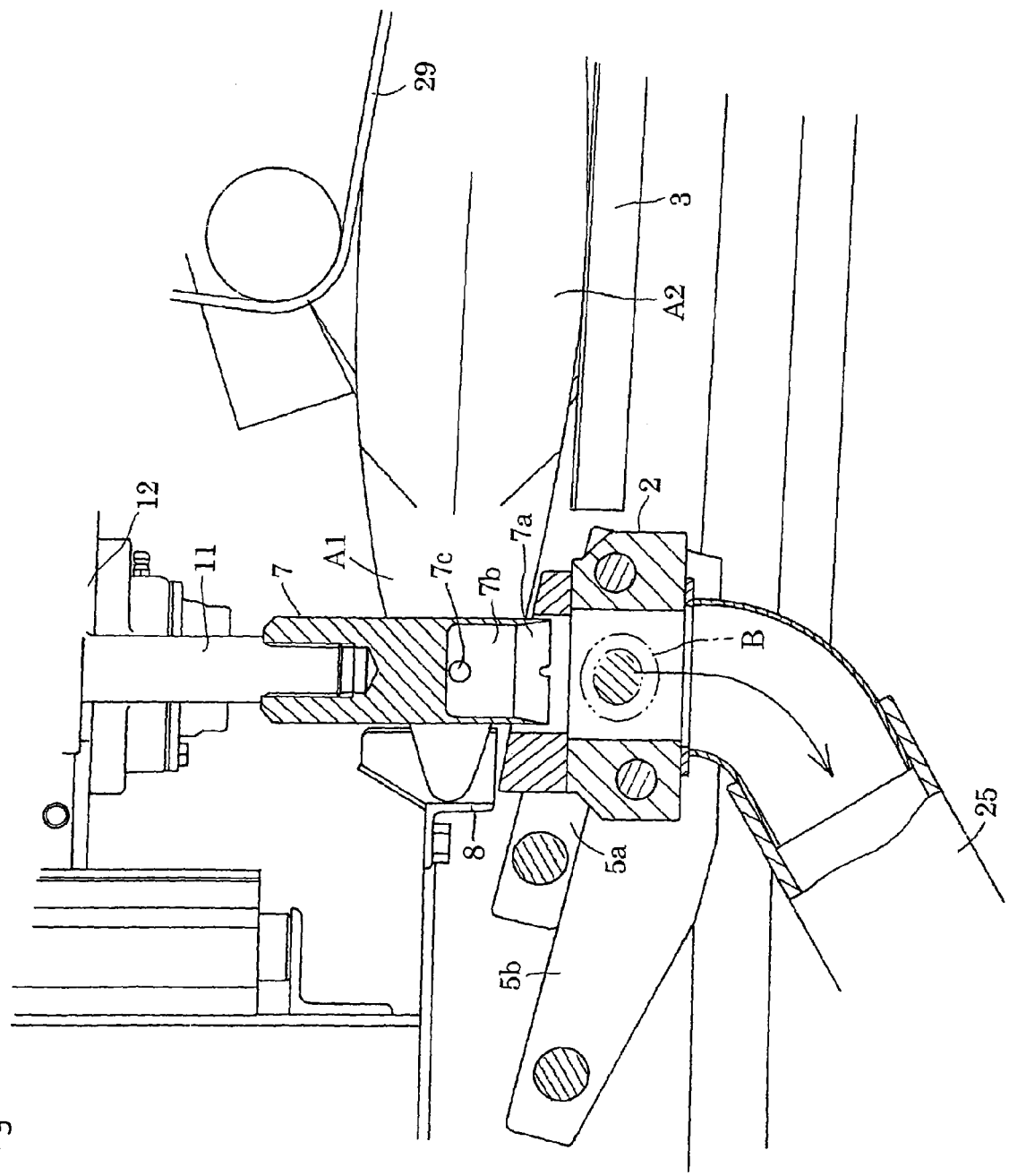
FIG. 11 is a vertical sectional side view showing the state where the eyeball section of the fish is punched out.

When the head part A1 of the fish A comes onto the head part supporting table 2, the photoelectric sensor 31 detects the state and the cylinder 21 is operated in the direction of moving down the elevating frame 12, and the punching-out blade body 7 rotatably mounted on the elevating frame 12 is moved down together with the elevating frame 12. The eyeball section B including the eyeball and the surrounding part is punched out by the punching out blade 7a while the punching-out blade body 7 is rotated by a motor 15, as shown in FIGS. 10 and 11. In the meantime, the punching out blade body 7 may be rotated without intermission during the punching out treatment of the eyeball section without depending on the detection by the photoelectric sensor 31.

The eyeball section B punched out by the punching out blade 7a is received and stored in the recess 7b of the punching out blade body 7 until the punching-out blade 7a of the punching-out blade body 7 penetrates from the upper-positioned eyeball section B2 through the lower-positioned eyeball section B1. When the punching-out blade 7a enters the eyeball section discharge hole 4 formed in the head part supporting table 2, the eyeball section B stored in the recess 7b is suctioned into the suction hose 25 through the eyeball section discharge hole 4 by the suction force of the suction hose 25. In this occasion, the eyeball section B can be suctioned instantly from the recess 7b into the suction hose 25 by the suction force of the suction hose 25 while sending the outside air to the back of the eyeball section B housed in the recess 7b through an air vent 7c formed in the deep part of the recess 7b in a manner of communicating with the outside. The eyeball section B suctioned into the suction hose 25 is collected and accumulated in the eyeball section collecting container 26. The accumulated eyeball section B is used as a material for a nutritive substance beneficial to health, or a material for a food product.

Figure 12:
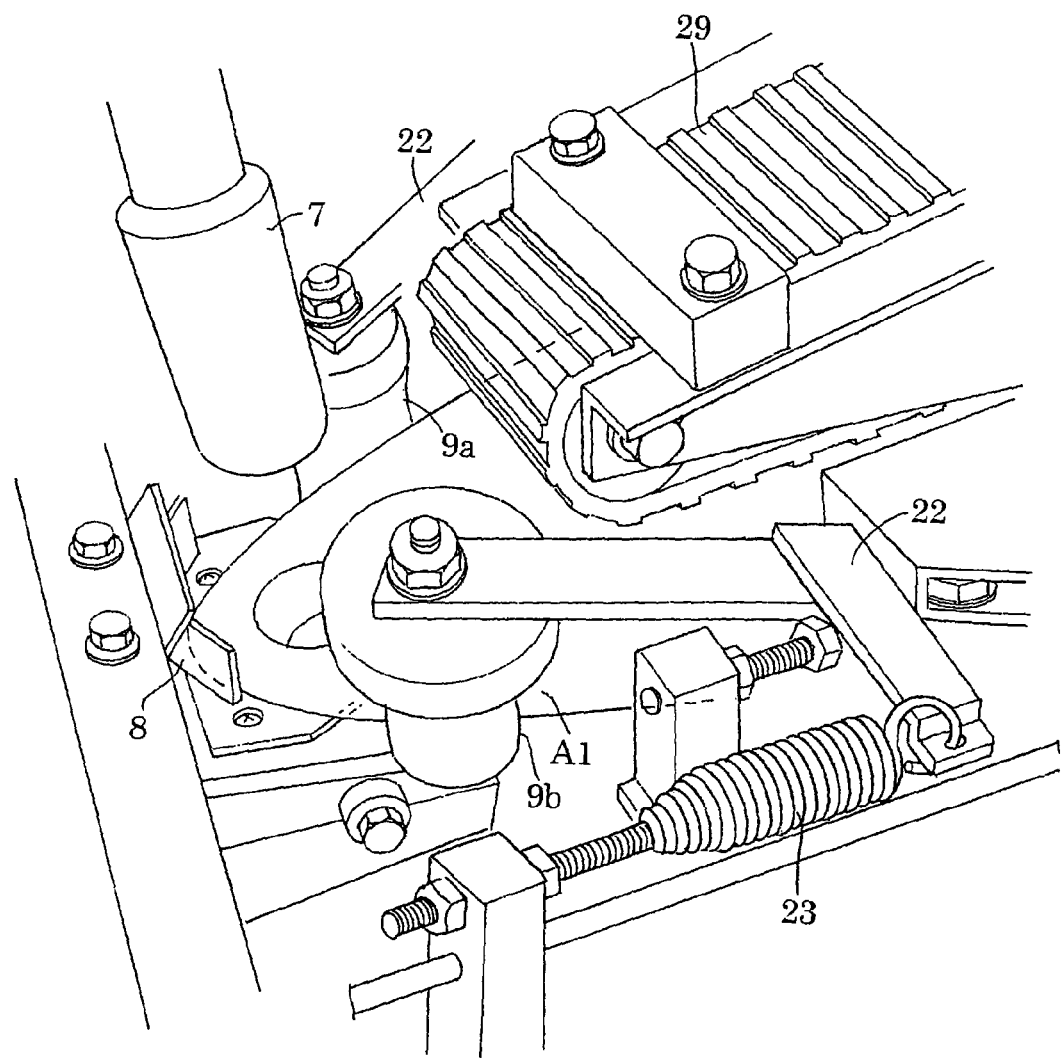
FIG. 12 is a perspective view of the head part supporting table immediately after elevation of an eyeball section punching-out blade body.
Figure 13:
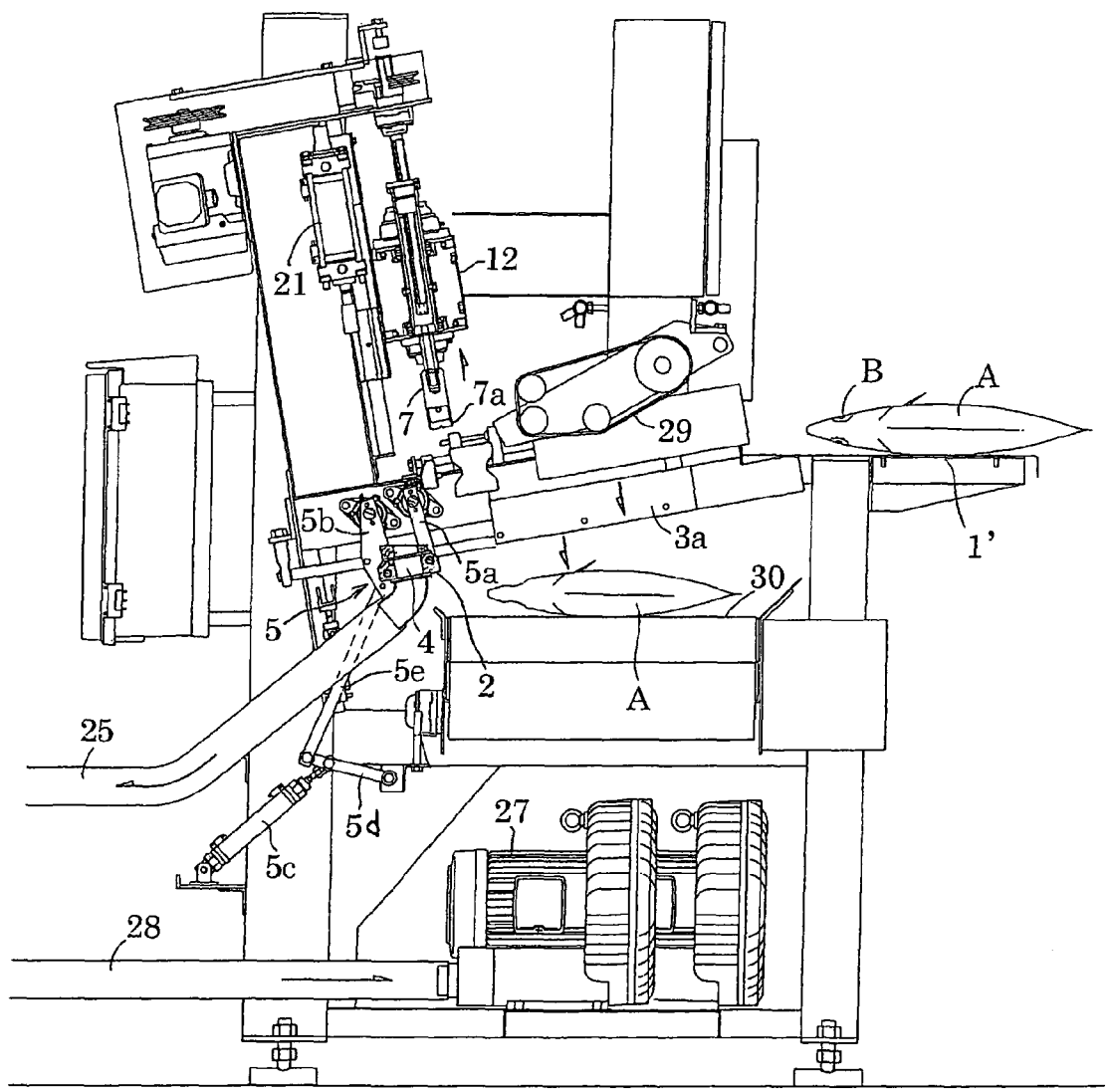
FIG. 13 is a side view of the device showing the state that the fish whose eyeball section is punched out is discharged downward.

In the meantime, the punching-out blade body 7 is raised by the control circuit after the eyeball section B of the fish A is punched out until it returns to the original position as shown in FIGS. 12 and 13. When the punching-out blade body 7 returns to the original position or when it is on the way to return to the original position after the punching-out blade body 7 leaves the head part A1, a detector, which is not shown in the drawings, like a limit switch is actuated by the elevating frame 12 or the piston rod of the cylinder 21 or the like for moving the elevating frame 12 up and down. The opening and closing mechanism 5 of the head part supporting table 2 and the opening and closing mechanism 6 of the body part supporting table 3 are actuated simultaneously by the detector so that the head part supporting table 2 and the body part supporting table 3 may open downward, and that the fish A after the eyeball section B is punched out may fall on the discharge conveyor 30 arranged on the lower side, as shown in FIG. 13, and be transmitted to a predetermined place outside the machine by the discharge conveyor 30.

The opening and closing mechanism 5 of the head part supporting table 2 is actuated by extension and contraction of the piston rod of the cylinder 5c actuated by the detector. In other words, when the piston rod of the cylinder 5c is contracted from the state that the head part A1 of the fish A is supported by the head part supporting table 2, the first and second levers 5d, 5e are bent forward into a dogleg shape, as shown in FIG. 13, and a front end of the second lever 5e moves to the obliquely downward front side. The parallel links 5a, 5b connected to the second lever 5e are rotated downward around the front end parts pivoted to the machine base 1. The head part supporting table 2 pivoted and supported between rear ends of the parallel links 5a, 5b is moved to the obliquely downward front side like the front end of the second lever 5e together with the suction hose 25, and the space closed by the head part supporting table 2 by that time is opened.

Figure 14:
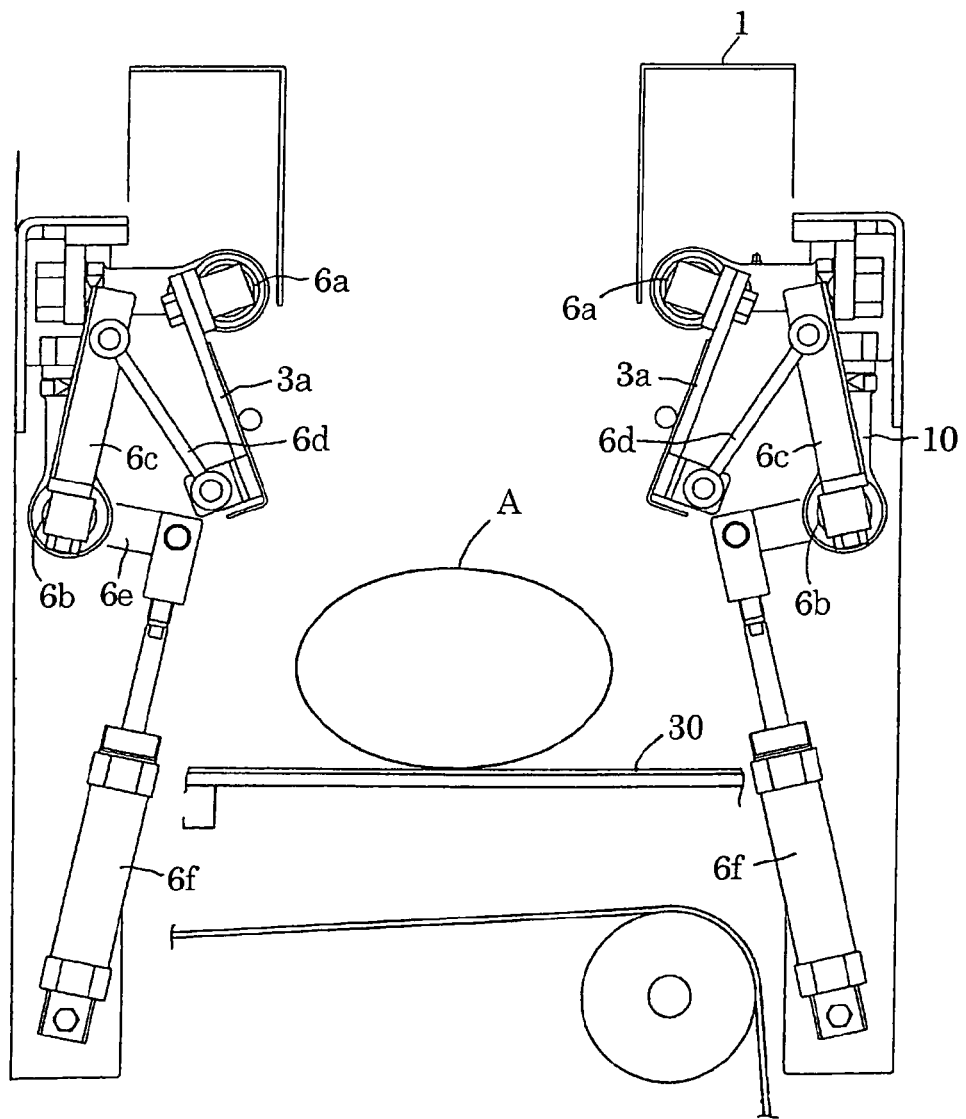
FIG. 14 is a front view of the part of the body part supporting table.

The opening and closing mechanism 6 of the body part supporting table 3 is also actuated simultaneously with the operation of the head part supporting table 2 by the detector. In other words, the cylinder 6f is actuated by the detector, and by rotating second parallel rotary rods 6b, 6b by the intermediary of the lever 6e, the levers 6c, 6c on both sides, to which outer ends of the second parallel rotary rods 6b, 6b are fixed, are rotated upward, respectively, as shown in FIG. 14. By the upward rotation of the levers 6c, 6c, the supporting table sections 3a, 3a on both sides constituting the body part supporting table 3 are respectively rotated downward around the first parallel rotary rods 6a, 6a by the intermediary of the connecting rods 6d, 6d, so that the space closed by the body part supporting table 3 by that time is opened.

As mentioned above, the head part supporting table 2 and the body part supporting table 3 are opened at the same time to allow the fish A to fall on the lower-positioned discharge conveyor after the eyeball section is punched out. Immediately after that, the cylinder 5c of the opening/closing mechanism 5 of the head part supporting table 2 is moved in the direction of extending the piston rod, and the cylinder 6f of the opening/closing mechanism 6 of the body part supporting table 3 is moved in the reverse direction to simultaneously return the head part supporting table 2 and the body part supporting table 3 to the original closed positions, as shown in FIG. 1, so that another fish A may be supplied to the body part supporting table 3 for undergoing the punching-out treatment of the eyeball section of the fish A in a similar manner.

1. Machine Base
2. Head Part Supporting Table
3. Body Part Supporting Table
4. Eyeball section Discharge Hole
5. Opening/Closing Mechanism of Head Part Supporting Table
6. Opening/Closing Mechanism of Body Part Supporting Table
7. Punching-Out Blade Body
8. Stopper
9. Head Part Gripping Means
21. Cylinder for Elevating Punching-Out Blade Body
25. Suction Hose

The invention claimed is:

1. A device for punching out and collecting an eyeball section of a fish comprising:

a head part supporting table arranged at a fish-feeding terminal end of a device base in a downward rotatable manner, the head part supporting table having an eyeball section discharge hole in a center of the head part supporting table through an upper face to a lower face of the head part supporting table, the eyeball section discharge hole allowing the eyeball section of the fish to discharge from the head part supporting table;

a body part supporting table arranged in an openable and closable manner to support a body part of the fish fed in a lying state and to remove the fish by opening the body part supporting table downward after punching out the eyeball section;

an eyeball section punching-out blade body of a circular cylindrical shape arranged above the eyeball section discharge hole formed in the head part supporting table in a vertically movable and rotatable manner, a lower end of the eyeball section punching-out blade body being formed into a punching-out blade to punch out the eyeball section of the fish while the lower end is moving down and is rotated, and to enter the eyeball section discharge hole formed in the head part supporting table;

a stopper for receiving and stopping a front end of the head part of the fish fed onto the head part supporting table from the body part supporting table, the stopper being made for positioning the eyeball section on the eyeball section discharge hole formed in the head part supporting table;

a head part gripping means arranged on both sides of the head part supporting table to grip the head part in a manner of sandwiching the head part and of allowing the head part to escape downward, a suction hose connected to the lower face of the head part supporting table in an integrated manner and communicating with the eyeball section discharge hole of the head part supporting table at an upper end opening part thereof;

a supporting table opening and closing mechanism for the head part supporting table constructed to enable the head part to be discharged downward from the head part supporting table by downward rotation of the head part supporting table, to which mechanism the suction hose is connected; and an opening and closing mechanism for the body part supporting table constructed to move in harmony with the supporting table opening and closing mechanism.

2. The device for punching out and collecting the eyeball section of the fish as claimed in claim 1, further comprising:
a fish-feeding conveyor arranged above the body part supporting table to feed the head part of the fish, which is fed onto the body part supporting table, toward the head part supporting table and to allow the stopper to receive and stop a front end of the head part.

3. The device for punching out and collecting the eyeball section of the fish as claimed in claim 1, further comprising:
a discharge conveyor arranged below the body part supporting table to discharge the fish to an outside of the body part supporting table after a punching-out treatment of the eyeball section.

4. The device for punching out and collecting the eyeball section of the fish as claimed in claim 2, further comprising:
a discharge conveyor arranged below the body part supporting table to discharge the fish to an outside of the body part supporting table after a punching-out treatment of the eyeball section.

5. The device for punching out and collecting the eyeball section of the fish as claimed in claim 1, wherein the head part gripping means comprises a pair of rollers urged in a direction of gripping the head part of the fish in a sandwiching manner by spring force, in which a first roller supporting a jaw of the head part has a circumferential groove of a dogleg shape in vertical section to receive and hold the jaw, and a second roller having no circumferential groove and receiving a top of the head part is formed into a columnar shape by which the top of the head can escape from a lower end of the roller while sliding on the circumferential surface of the roller.

6. The device for punching out and collecting the eyeball section of the fish as claimed in claim 2, wherein the head part gripping means comprises a pair of rollers urged in a direction of gripping the head part of the fish in a sandwiching manner by spring force, in which a first roller supporting a jaw of the head part has a circumferential groove of a dogleg shape in vertical section to receive and hold the jaw, and a second roller having no circumferential groove and receiving a top of the head part is formed into a columnar shape by which the top of the head can escape from a lower end of the roller while sliding on the circumferential surface of the roller.

7. The device for punching out and collecting the eyeball section of the fish as claimed in claim 3, wherein the head part gripping means comprises a pair of rollers urged in a direction of gripping the head part of the fish in a sandwiching manner by spring force, in which a first roller supporting a jaw of the head part has a circumferential groove of a dogleg shape in vertical section to receive and hold the jaw, and a second roller having no circumferential groove and receiving a top of the head part is formed into a columnar shape by which the top of the head can escape from a lower end of the roller while sliding on the circumferential surface of the roller.

8. The device for punching out and collecting the eyeball section of the fish as claimed in claim 4, wherein the head part gripping means comprises a pair of rollers urged in a direction of gripping the head part of the fish in a sandwiching manner by spring force, in which a first roller supporting a jaw of the head part has a circumferential groove of a dogleg shape in vertical section to receive and hold the jaw, and a second roller having no circumferential groove and receiving a top of the head part is formed into a columnar shape by which the top of the head can escape from a lower end of the roller while sliding on the circumferential surface of the roller.

9. The device for punching out and collecting the eyeball section of the fish as claimed in claim 1, further comprising:
a sensor for detecting the head part of the fish fed onto the head part supporting table, the sensor being arranged on a side of the head part supporting table to actuate the punching-out blade.

10. The device for punching out and collecting the eyeball section of the fish as claimed in claim 2, further comprising:
a sensor for detecting the head part of the fish fed onto the head part supporting table, the sensor being arranged on a side of the head part supporting table to actuate the punching-out blade.

11. The device for punching out and collecting the eyeball section of the fish as claimed in claim 3, further comprising:
a sensor for detecting the head part of the fish fed onto the head part supporting table, the sensor being arranged on a side of the head part supporting table to actuate the punching-out blade.

12. The device for punching out and collecting the eyeball section of the fish as claimed in claim 4, further comprising:
a sensor for detecting the head part of the fish fed onto the head part supporting table, the sensor being arranged on a side of the head part supporting table to actuate the punching-out blade.

13. The device for punching out and collecting the eyeball section of the fish as claimed in claim 5, further comprising:
a sensor for detecting the head part of the fish fed onto the head part supporting table, the sensor being arranged on a side of the head part supporting table to actuate the punching-out blade.

14. The device for punching out and collecting the eyeball section of the fish as claimed in claim 6, further comprising:
a sensor for detecting the head part of the fish fed onto the head part supporting table, the sensor being arranged on a side of the head part supporting table to actuate the punching-out blade.

15. The device for punching out and collecting the eyeball section of the fish as claimed in claim 7, further comprising:
a sensor for detecting the head part of the fish fed onto the head part supporting table, the sensor being arranged on a side of the head part supporting table to actuate the punching-out blade.

16. The device for punching out and collecting the eyeball section of the fish as claimed in claim 8, further comprising:
a sensor for detecting the head part of the fish fed onto the head part supporting table, the sensor being arranged on a side of the head part supporting table to actuate the punching-out blade.

* * * * *